US011099903B2

(12) United States Patent
Lei et al.

(10) Patent No.: US 11,099,903 B2
(45) Date of Patent: Aug. 24, 2021

(54) SYSTEM AND METHOD FOR DETERMINING AND TRACKING CLOUD CAPACITY METRICS

(71) Applicant: ServiceNow, Inc., Santa Clara, CA (US)

(72) Inventors: Max Qiwen Lei, Newcastle, WA (US); Suvarna Patil, Issaquah, WA (US); Brian James Linnenkamp, Renton, WA (US); Jacob Roland Lindstrom, Seattle, WA (US); Demietrich Baker, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 83 days.

(21) Appl. No.: 16/704,984

(22) Filed: Dec. 5, 2019

(65) Prior Publication Data
US 2021/0173713 A1      Jun. 10, 2021

(51) Int. Cl.
*G06F 9/50* (2006.01)
*G06F 11/30* (2006.01)
*G06F 9/451* (2018.01)

(52) U.S. Cl.
CPC ............ *G06F 9/5027* (2013.01); *G06F 9/451* (2018.02); *G06F 9/5083* (2013.01); *G06F 11/3006* (2013.01); *G06F 2209/503* (2013.01)

(58) Field of Classification Search
CPC ...... G06F 9/5027; G06F 9/451; G06F 9/5083; G06F 11/3006; G06F 2209/503
See application file for complete search history.

(56) References Cited

U.S. PATENT DOCUMENTS

| | | |
|---|---|---|
| 6,816,898 B1 | 11/2004 | Scarpelli et al. |
| 7,020,706 B2 | 3/2006 | Cates et al. |
| 7,716,353 B2 | 5/2010 | Golovinsky et al. |
| 7,769,718 B2 | 8/2010 | Murley et al. |
| 7,925,981 B2 | 4/2011 | Pourheidari et al. |
| 8,402,127 B2 | 3/2013 | Solin |
| 8,612,408 B2 | 12/2013 | Trinon et al. |
| 8,832,652 B2 | 9/2014 | Mueller et al. |
| 9,098,322 B2 | 8/2015 | Apte et al. |
| 9,317,327 B2 | 4/2016 | Apte |
| 9,363,252 B2 | 6/2016 | Mueller et al. |

(Continued)

*Primary Examiner* — Sisley N Kim
(74) *Attorney, Agent, or Firm* — Fletcher Yoder PC

(57) ABSTRACT

A cloud capacity system enables calculation and tracking of cloud capacity metrics for data center pods. The system includes a "Cloud Capacity Snapshot" table having a number of different cloud capacity columns; a "Cloud Capacity Query" table that stores a respective, customizable query for each of the cloud capacity columns defining criteria for selecting and combining data to calculate the corresponding cloud capacity metric value; and a "Cloud Capacity URLs" table that stores cloud capacity universal resource locator (URLs). Each cloud capacity URL embodies or encodes a respective cloud capacity query of the "Cloud Capacity Query" table for a given combination of a particular cloud capacity column and a particular pod in the "Cloud Capacity Snapshot" table. As such, by executing the queries encoded in the "Cloud Capacity URLs" table, each cloud capacity field of the "Cloud Capacity Snapshot" table is populated with the corresponding cloud capacity metric value.

20 Claims, 9 Drawing Sheets

(56) References Cited

U.S. PATENT DOCUMENTS

| | | |
|---|---|---|
| 9,645,833 B2 | 5/2017 | Mueller et al. |
| 9,654,473 B2 | 5/2017 | Miller |
| 9,766,935 B2 | 9/2017 | Kelkar et al. |
| 9,805,322 B2 | 10/2017 | Kelkar et al. |
| 9,819,729 B2 | 11/2017 | Moon et al. |
| 10,454,752 B2 * | 10/2019 | Margalit ................ G06Q 50/10 |

* cited by examiner

| ☰ CLOUD CAPACITY URLS | | 226 | | |
|---|---|---|---|---|
| ▷ ALL | | NEW SEARCH COLUMN ▽ SEARCH | ◁◁ ▽ [1] △ ▷▷ TO 1,000 OF 13,950 | |
| ⚙ 🔍 ≡ COLUMN — 352A | ≡ POD — 352B | ≡ URL — 352C | ≡ COUNT | ≡ ID |
| SEARCH | SEARCH | SEARCH | SEARCH | SEARCH |
| ⊖ ☐ u_catalogs_maria_db | IFA400 | /cmdb_ci_db_mysql_instance_list.do?sysparm_query=versionLIKEMaria^u_ho... | 0 | 67034 |
| ⊖ ☐ u_sharedpoints_db_availmax | IFA400 | /cmdb_ci_linux_server_list.do?sysparm_query=u_points_available+0^serve... | 0 | 74026 |
| ⊖ ☐ u_sed_servers_db_gizas | IFA400 | /cmdb_ci_linux_server_list.do?sysparm_query=u_role_LIKEDatabase^u_is_en... | 0 | 37823 |
| ⊖ ☐ u_sed_servers_db_dead | IFA400 | /cmdn_ci_linux_server_list.do?sysparm_query=customerISEMPTY^u_roleLIKE... | 0 | 95263 |
| ⊖ ☐ u_12tsenver_free_nocust | IFA400 | /cmdb_ci_linux_server_list?sysparm_query=u_sku.u_sku=4dc8906f373d40859e... | 0 | 45425 |
| ⊖ ☐ u_lifecycle_fyl45_appsstotal | IFA400 | /cmdb_ci_linux_server_list?sysparm_query=u_sku.u_nameLIKEFY14.5^nam... | 0 | 98804 |
| ⊖ ☐ u_lifecycle_fyl45_appsnotempty | IFA400 | /cmdb_ci_linux_server_list?sysparm_query=u_sku.u_nameLIKEFY14.5^nam... | 0 | 41411 |
| ⊖ ☐ u_devpoints_db_used | IFA400 | /cmdb_ci_linux_server_list.do?sysparm_query=operational_status=1^u_dat... | 0 | 72409 |
| ⊖ ☐ u_iqqq_servers_dbs_used | IFA400 | /cmdb_ci_linux_server_list.do?sysparm_query=u_role=database_and_backup... | 0 | 31322 |
| ⊖ ☐ u_catalogs_cats_4tb | IFA400 | /cmdb_ci_db_catalog_list.do?sysparm_query=u_size_mb>4200000^ORref_mdb... | 0 | 75145 |
| ⊖ ☐ u_app_servers_app_used | IFA400 | /cmdb_ci_linux_server_list.dp?sysparm]query=u_role=application^server_... | 0 | 76510 |
| ⊖ ☐ u_demopoints_db_used | IFA400 | /cmdb_ci_linux_server_list.do?sysparm_query=u_role=database_type!=Oracle^se... | 0 | 59493 |
| ⊖ ☐ u_iqqq_servers_apps_avail | IFA400 | /cmdb_ci_linux_server_list.do?sysparm_query=u_role=application^u_is_iq... | 0 | 64592 |
| ⊖ ☐ u_clotho_ded_ptsavail | IFA400 | /cmdb_ci_linux_server_list.do?sysparm_query=u_role_clotho_and_backup^s... | 0 | 58712 |
| ⊖ ☐ u_lifecyclefyl4_appstotal | IFA400 | /cmdb_ci_linux_server_list.do?sysparm_query=u_sku.u_nameLIKEFY14-^name... | 0 | 67769 |
| ⊖ ☐ u_catalogs_oracle_cats | IFA400 | /cmdb_ci_db_catalog_list/do?sysparm_query=database_instance.nameLIKEor... | 0 | 10436 |
| ⊖ ☐ u_db_servers_dbs_dead | IFA400 | /cmdb_ci_linux_server_list.do?sysparm_query=us_is_encrypted=false^custo... | 0 | 18986 |

SYSTEM AND METHOD FOR DETERMINING AND TRACKING CLOUD CAPACITY METRICS

BACKGROUND

The present disclosure relates generally to cloud computing environments, and, more specifically, to determining and tracking cloud capacity metrics within a data center hosting a cloud computing environment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

A data center hosting one or more cloud computing environment may be associated with a number of different cloud capacity metrics. For example, a pod of a data center may host five client instances, two demo instances, and one developer instance, and each of these numerical values represents a distinct cloud capacity metric value of the data center pod. A data center may include numerous pods, each associated with numerous cloud capacity metrics, resulting in a massive number of cloud capacity metrics. It may be desirable for these cloud capacity metrics to be periodically updated, which can involve numerous data requests and calculations. Moreover, it may be desirable to determine and track certain cloud capacity metrics for a pod that have not been previously determined or tracked, or to customize the manner in which certain cloud capacity metrics are tracked. As such, it is recognized that there is a need for improved ways of determining and tracking cloud capacity metrics in a customizable manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a system and method for efficiently and effectively tracking of various cloud capacity metrics of a data center on a per pod basis in a customizable and scalable manner. Present embodiments include corresponding data structures and computer-implemented instructions to enable calculation and tracking of these cloud capacity metrics. In particular, the data structures include a "Cloud Capacity Snapshot" table that includes a number of different cloud capacity columns, each dedicated to a particular cloud capacity metric of a data center on a per pod basis. The data structures include a "Cloud Capacity Query" table, wherein each row or entry of the table stores a respective, customizable cloud capacity query for each of the cloud capacity columns of the "Cloud Capacity Snapshot" table. Each cloud capacity query defines filter criteria for selecting data, as well as a combination operation (e.g., sum, count, etc.) for calculating the cloud capacity metric value from the selected data. The data structures include a "Cloud Capacity URLs" table that stores a cloud capacity universal resource locator (URL) for each cloud capacity field of the "Cloud Capacity Snapshot" table. More specifically, each cloud capacity URL embodies or encodes a respective cloud capacity query of the "Cloud Capacity Query" table for a given combination of a particular cloud capacity column and a particular pod in the "Cloud Capacity Snapshot" table.

As such, by executing the queries encoded in the "Cloud Capacity URLs" table, each cloud capacity field of the "Cloud Capacity Snapshot" table may be populated with the corresponding cloud capacity metric value. For example, at a predetermined time of day or in response to changes to a cloud capacity query of the "Cloud Capacity Query" table, the URLs of the "Cloud Capacity URLs" table are updated, and then new cloud capacity metric values are calculated for each cloud capacity field of the "Cloud Capacity Snapshot" table based on the updated URLs. In certain embodiments, each of the cloud capacity metric values of the "Cloud Capacity Snapshot" table may be stored as a respective URL that presents the corresponding cloud capacity metric value and that points to a query having the same filter criteria as the underlying cloud capacity query. In certain embodiments, the previously calculated cloud capacity metric values may be archived for later cloud capacity trend analysis. Additionally, in certain embodiments, auditing information can be captured for changes to the "Cloud Capacity Query" table. The disclosed system includes a graphical user interface (GUI) to enable an administrator to view the data stored and referenced in the "Cloud Capacity Snapshot" table, and to enable the administrator to modify the queries of the "Cloud Capacity Query" table.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 6, 7, 8, and 9 are simulated screenshots of portions of a graphical user interface (GUI) of the cloud capacity system.

DETAILED DESCRIPTION

Figure 1:
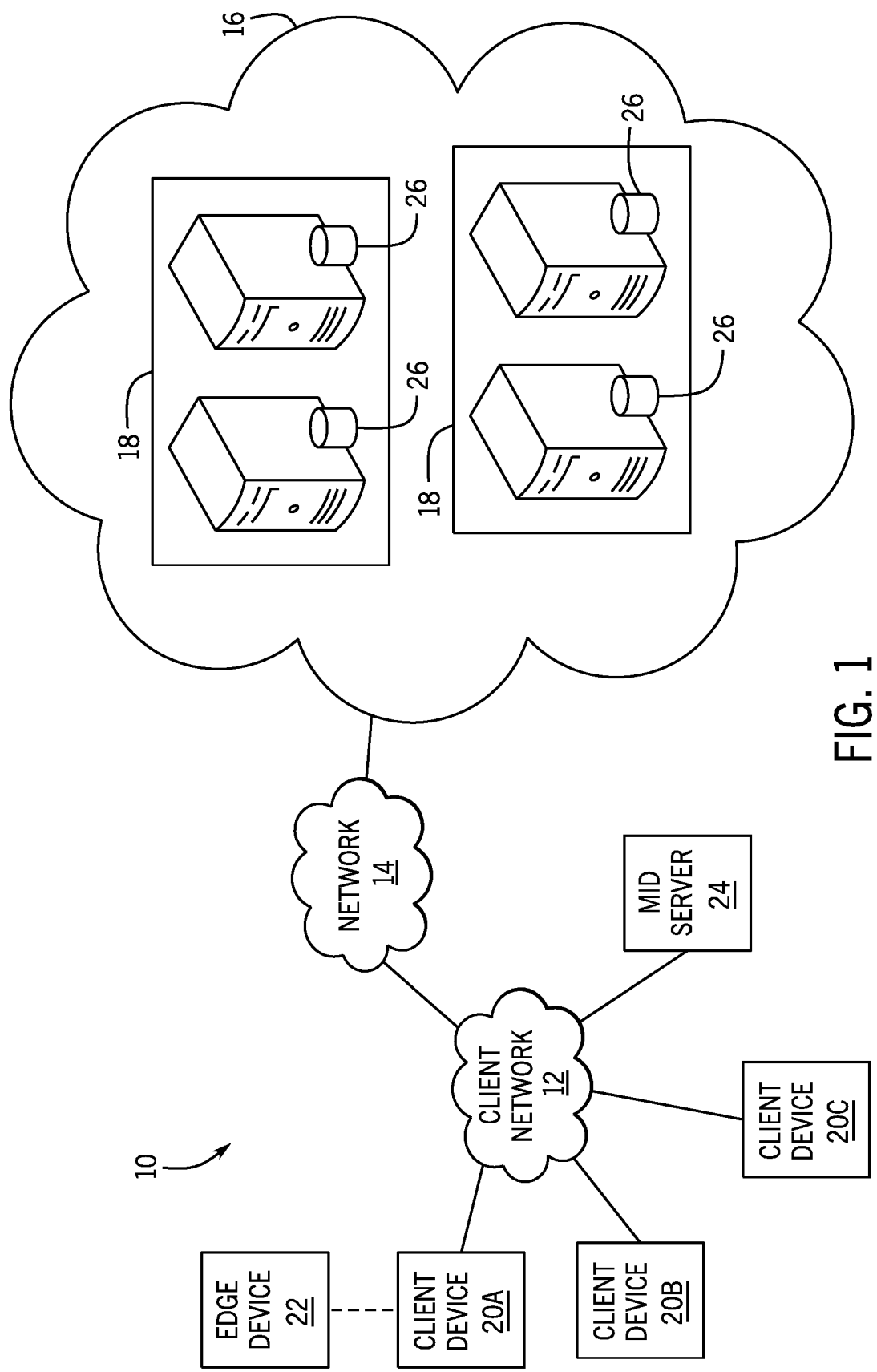
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Present embodiments are directed to a system and method for efficiently and effectively tracking of various cloud capacity metrics for a data center in a customizable and scalable manner. As used herein, a "cloud capacity" refers to a metric of usage and available resources of a particular pod. A non-limiting list of example cloud capacity metrics include, a number of instances (e.g., production, developer, or demonstration instances) hosted by a pod, a number of shared database points (e.g., points used, max available points), a number of shared application points (e.g., points used, max available points), and so forth. As used herein, a "pod" refers to a distinct set or group of hardware resources (e.g., servers, networking devices, etc.) of a data center.

Present embodiments include corresponding data structures and computer-implemented instructions to enable calculation and tracking of cloud capacity metrics. In particular, the data structures include a "Cloud Capacity Snapshot" table that includes a number of different cloud capacity columns, each dedicated to a particular cloud capacity metric of a data center on a per pod basis. The data structures include a "Cloud Capacity Query" table, wherein each row or entry of the table stores a respective, customizable cloud capacity query for each of the cloud capacity columns of the "Cloud Capacity Snapshot" table. Each cloud capacity query defines filter criteria for selecting data, as well as a combination operation (e.g., sum, count, etc.) for calculating the cloud capacity metric value from the selected data. The data structures include a "Cloud Capacity URLs" table that stores a respective cloud capacity universal resource locator (URL) for each cloud capacity field of the "Cloud Capacity Snapshot" table. Each cloud capacity URL embodies or encodes a respective cloud capacity query of the "Cloud Capacity Query" table for a given combination of a particular cloud capacity column and a particular pod in the "Cloud Capacity Snapshot" table.

As such, by executing the queries encoded in the "Cloud Capacity URLs" table, each cloud capacity field of the "Cloud Capacity Snapshot" table may be populated with the corresponding cloud capacity metric value. For example, at a predetermined time of day or in response to changes to a cloud capacity query of the "Cloud Capacity Query" table, the URLs of the "Cloud Capacity URLs" table are updated, and then new cloud capacity metric values are calculated for each cloud capacity field of the "Cloud Capacity Snapshot" table based on the updated URLs. In certain embodiments, each of the cloud capacity metric values of the "Cloud Capacity Snapshot" table may be stored as a respective URL that presents the corresponding cloud capacity metric value and that points to a query having the same filter criteria as the underlying cloud capacity query. In certain embodiments, the previously calculated cloud capacity metric values may be archived for later cloud capacity trend analysis. Additionally, in certain embodiments, auditing information can be captured for changes to the "Cloud Capacity Query" table. The disclosed system includes a graphical user interface (GUI) to enable an administrator to view the data stored and referenced in the "Cloud Capacity Snapshot" table, and to enable the administrator to modify the queries of the "Cloud Capacity Query" table.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
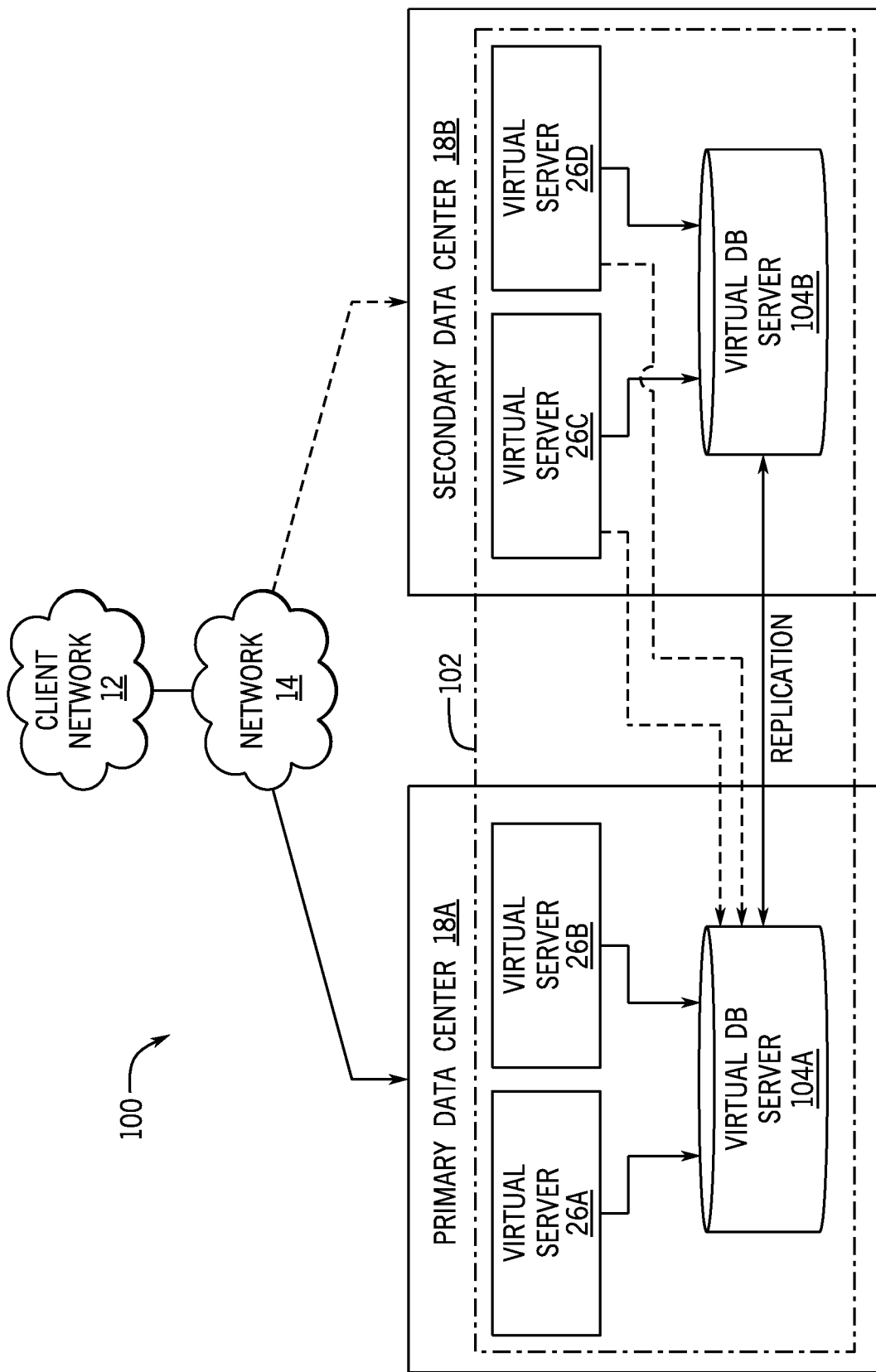
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
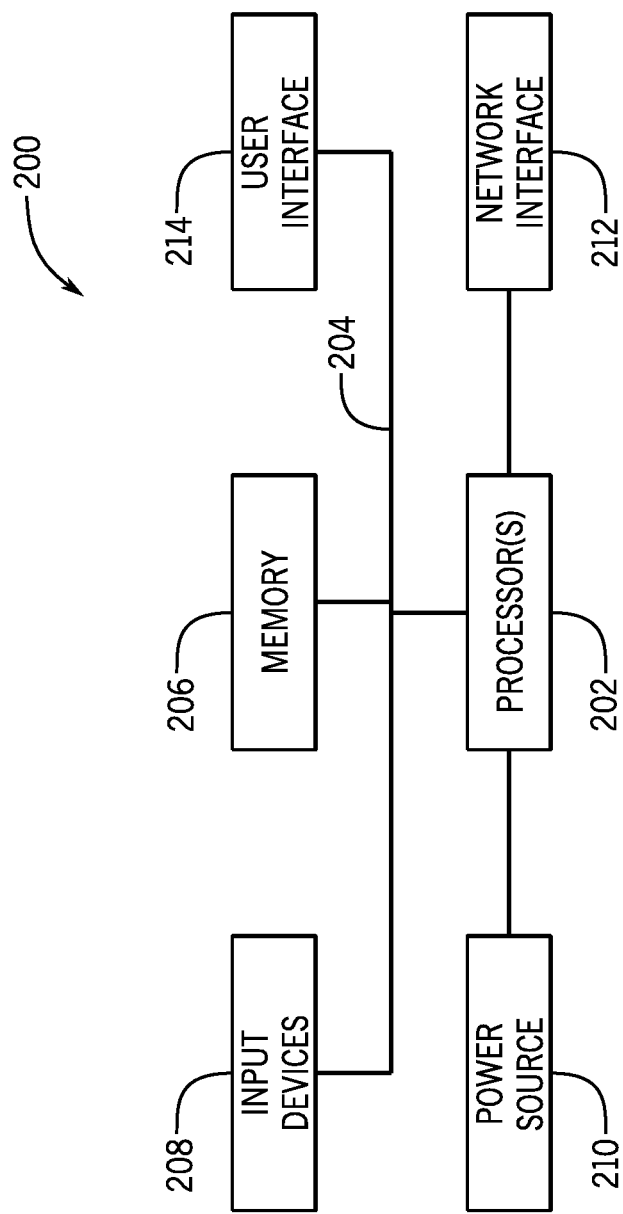
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
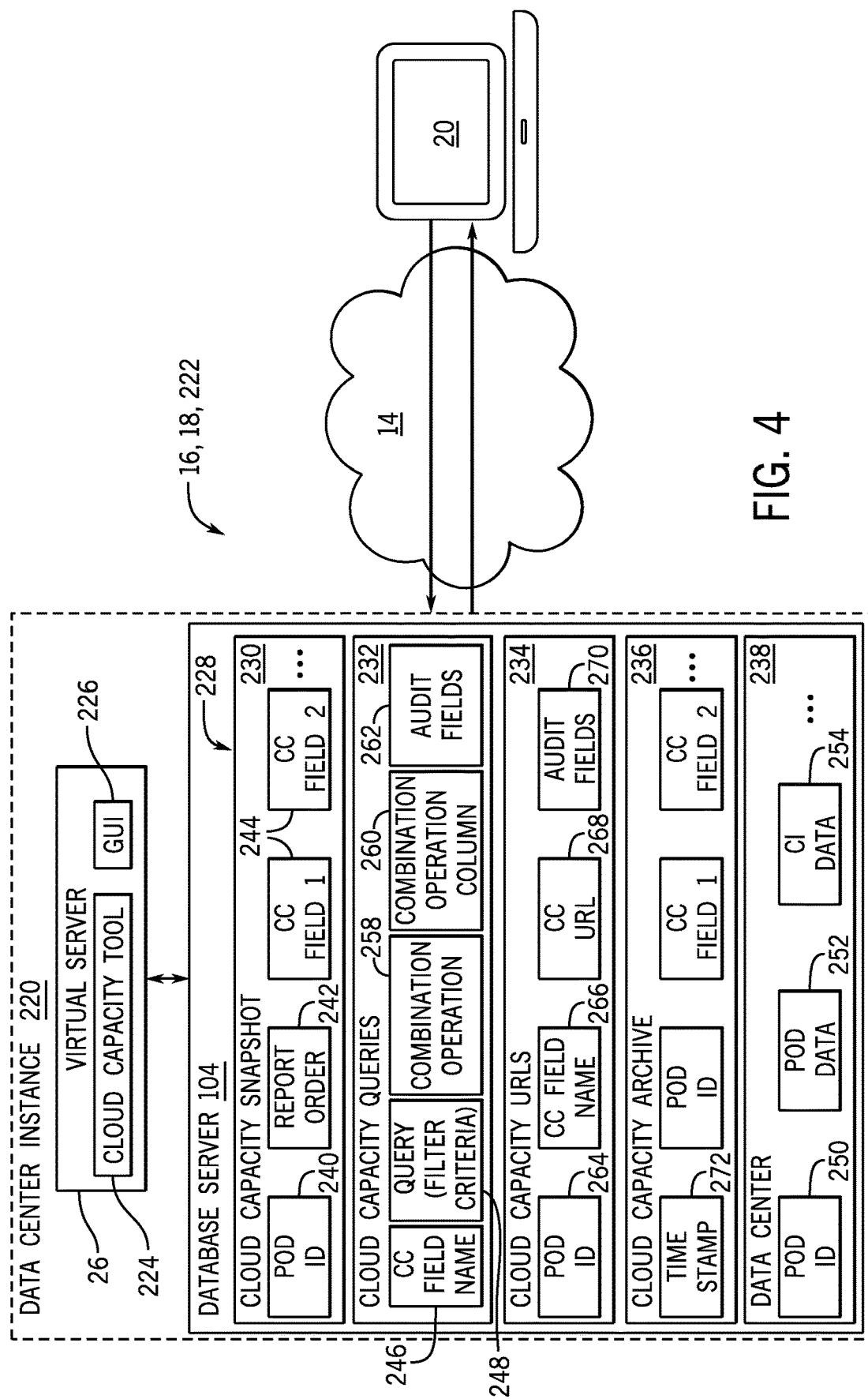
FIG. 4 is a block diagram illustrating an embodiment in which a hosted data center instance includes a cloud capacity system, wherein the cloud capacity system includes a data schema having a "Cloud Capacity Snapshot" table, a "Cloud Capacity Queries" table, and a "Cloud Capacity URLs" table, in accordance with aspects of the present disclosure.

With the preceding in mind, FIG. 4 is a block diagram illustrating an embodiment in which a virtual server 26 and a database server 104 of a data center 18 supports and enables a data center instance 220, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the data center instance 220 (e.g., via a web browser running on the device 20). Data center instance 220 is supported by virtual servers 26 similar to those explained with respect to FIG. 2, and is illustrated here to show support for the disclosed functionality described herein within the data center instance 220. Cloud provider infrastructures are generally configured to support a plurality of end-user devices, such as device(s) 20, concurrently, wherein each end-user device is in communication with the single data center instance 220. Also, cloud provider infrastructures may be configured to support any number of instances, such as the data center instance 220 and/or client instances, concurrently, with each of the instances in communication with one or more end-user devices. As mentioned above, an end-user (e.g., an administrator) may also interface with data center instance 220 using an application that is executed within a web browser.

More specifically, FIG. 4 illustrates an embodiment of a cloud capacity system 222 as part of the data center instance 220. For the illustrated embodiment, the cloud capacity system 222 includes a cloud capacity tool 224 (also referred to herein as a cloud capacity application 224) that is hosted by the virtual server 26. In certain embodiments, the virtual server 26 hosting the cloud capacity system 222 may be referred to herein as the cloud capacity server 26. The cloud capacity tool 224 includes instructions that are stored in a suitable memory (e.g., memory 206) and executed by a suitable processor (e.g., processor(s) 202) associated with the virtual server 26 to enable the cloud capacity tracking behavior set forth herein. The cloud capacity system 222 includes a graphical user interface (GUI) 226 that enables an administrator to view and modify aspects of the cloud capacity system 222, as set forth below.

The cloud capacity system 222 illustrated in FIG. 4 includes the database server 104 of the data center instance 220, which stores multiple tables of a data schema 228 that enable operation of the cloud capacity system 222. For the illustrated embodiment, these tables include a "Cloud Capacity Snapshot" table 230, a "Cloud Capacity Queries" table 232, a "Cloud Capacity URLs" table 234, a "Cloud Capacity Archive" table 236, and a "Data Center" table 238. It may be appreciated that the illustrated tables are merely provided as an example, and in other embodiments, the database server 104 may store the cloud capacity data in a different manner, in accordance with the present disclosure. In describing these tables, those skilled in the art will appreciate that the terms "column" and "field" are used herein in a largely interchangeable manner.

For the embodiment illustrated in FIG. 4, the "Cloud Capacity Snapshot" table 230 stores a collection of current cloud capacity metric values for the data center 18 hosting the data center instance 220 on a per pod basis. As such, each row or entry in the "Cloud Capacity Snapshot" table 230 includes a "Pod ID" field 240 that is designed to store a suitable value (e.g., a string value, an integer value) that uniquely identifies a particular pod of the data center 18. In certain embodiments, the "Pod ID" field 240 may serve as the primary key for the "Cloud Capacity Snapshot" table 230. Each entry in the illustrated "Cloud Capacity Snapshot" table 230 also includes a "Report Order" field 242 that stores an integer value indicating the relative desired position of each pod when the table is presented by the GUI 226, as discussed below. Additionally, each entry in the illustrated "Cloud Capacity Snapshot" table 230 includes a number of cloud capacity fields 244, each designed to store a different cloud capacity metric value. As discussed below, in certain embodiments, each of the cloud capacity fields 244 is designed to at least store an integer value for the corresponding cloud capacity metric. In other embodiments, each of the cloud capacity fields 244 stores a respective URL that is designed to present the integer value for a particular cloud capacity metric value, and designed to point or refer to a query that returns the underlying data from which the cloud capacity metric value was calculated.

For the embodiment illustrated in FIG. 4, each row or entry of the "Cloud Capacity Queries" table 232 stores a customizable query that defines how a particular cloud capacity metric value will be calculated for each of the cloud capacity columns 244 of the "Cloud Capacity Snapshot" table. As illustrated, each entry in the "Cloud Capacity Queries" table 232 includes a "CC Field Name" field 246 that stores a unique string of the name of the particular cloud capacity field of the "Cloud Capacity Snapshot" that corresponds to the query. As such, in certain embodiments, the "CC Field Name" field 246 may serve as the primary key for the "Cloud Capacity Queries" table 232. Each entry in the illustrated "Cloud Capacity Queries" table 232 includes a "Query" field 248 (also referred to herein as the filter criteria 248) that stores a string that defines the filter criteria for selecting data from a "Data Center" table 238 hosted by the database server 104. Entries in the illustrated "Data Center" table 238 include a "Pod ID" field 250, a "Pod data" field 252 and a "Configuration items (CI)" data field 254, among others, that store information regarding the current configuration and resource usage of each pod of the data center 18. Each entry in the illustrated "Cloud Capacity Queries" table 232 includes a "Combination Operation" field 256 indicating the type of combination operation (e.g., sum, count, minimum, maximum, average, etc.) that will be used to calculate of the value of the particular cloud capacity metric from the data selected by the filter criteria 248. Each entry in the illustrated "Cloud Capacity Queries" table 232 includes a "Combination Operation Column" field 260 indicating to which column of the data selected by the query the combination operation will be applied. Additionally, in certain embodiments, each entry in the illustrated "Cloud Capacity Queries" table 232 includes one or more auditing fields 262 (e.g., a "Created" timestamp field, a "Created by" field, an "Updated" timestamp field, an "Updated by" field, an "Updates" count field, etc.) to enable detailed tracking of changes to the "Cloud Capacity Queries" table 232.

For the embodiment illustrated in FIG. 4, each row or entry of the "Cloud Capacity URLs" table 234 stores a particular cloud capacity URL that encodes a particular cloud capacity query from the "Cloud Capacity Queries"

table 232 for a particular cloud capacity field of the "Cloud Capacity Snapshot" table 230. That is, while each cloud capacity query stored in the "Cloud Capacity Queries" table 232 generally defines the filter criteria 248, the combination operation 256, and so forth, to calculate all of the cloud capacity metric values of a particular cloud capacity column of the "Cloud Capacity Snapshot" table 230, each URL stored in the "Cloud Capacity URLs" table 234 embodies the cloud capacity query for each cloud capacity field of the "Cloud Capacity Snapshot" table 230 (e.g., for each unique combination of a particular data center pod and a particular cloud capacity metric).

With the foregoing in mind, each entry in the illustrated "Cloud Capacity URLs" table 234 includes a "Pod ID" field 264 value that uniquely identifies a pod of the data center 18, as well as a "CC Field Name" field 266 value that uniquely identifies a query of the "Cloud Capacity Queries" table. As such, in certain embodiments, a combination of the "Pod ID" field 264 value and the "CC Field Name" field 266 value may serve as the primary key for the "Cloud Capacity URLs" table 234. Additionally, each entry in the illustrated "Cloud Capacity URLs" table 234 includes a "CC URL" field 268 storing a string that encodes the filter criteria 248, the combination operation 256, and so forth, of the related query in the "Cloud Capacity Queries" table 232 specifically for the pod indicated by the value of the "Pod ID" field 264. In certain embodiments, each entry in the "Cloud Capacity URLs" table 234 also includes one or more auditing fields 270 (e.g., a "Created" timestamp field, a "Created by" field, an "Updated" timestamp field, and "Updated by" field, an "Updates" count field, etc.) to enable detailed tracking of changes to the table.

For the embodiment illustrated in FIG. 4, the data schema 228 includes a "Cloud Capacity Archive" table 236 that is designed to store archival copies of the "Cloud Capacity Snapshot" table 230. That is, as discussed herein, since the "Cloud Capacity Snapshot" table 230 may be updated at different times (e.g., daily, nightly, hourly), prior to updating, the cloud capacity system 222 may store and preserve the cloud capacity metric values of each of the cloud capacity fields 244 in the "Cloud Capacity Archive" table 236. As such, the "Cloud Capacity Archive" table 236 can be used by the cloud capacity system 222 to generate trend data (e.g., capacity increases, capacity decreases, steady-state capacity) for various cloud capacity metrics. For example, in certain embodiments, the "Cloud Capacity Snapshot" table 230 may be updated daily, and, prior to updating, the contents of the table may be copied over to the "Cloud Capacity Archive" table 236. In certain embodiments, the "Cloud Capacity Snapshot" table 230 may have the same fields as the "Cloud Capacity Snapshot" data, along with a "Time Stamp" field 272 that stores a suitable value indicating when the archival occurred.

It may be appreciated that the tables of the data schema 228 may be related to one another, and these relationships may be enforced via suitable features of the database server 104. For example, in certain embodiments, the data schema 228 may represent a relational database structure. For such embodiments, the "Pod ID" field 264 of the "Cloud Capacity URLs" table 234 may have a foreign key relationship to the primary key "Pod ID" field 240 of the "Cloud Capacity Snapshot" table 230, while the "CC Field Name" field 266 may have a foreign key relationship to the primary "CC Field Name" field 246 of the "Cloud Capacity Queries" table 232. Similarly, the values of "CC Field Name" field 246 of the "Cloud Capacity Queries" table 232 are restricted to the names of the cloud capacity fields 244 of the "Cloud Capacity Snapshot" table 230, wherein the names of these columns may be stored within the "Data Center" table 238 in certain embodiments. In certain embodiments, this relationship, as well as other relationships within the data schema 228, may be enforced using suitable business rules, class relationships, and/or other suitable features of the database server 104. For example, upon adding a new cloud capacity column 244 to the "Cloud Capacity Snapshot" table 230, the database server 104 may execute a business rule that creates a default entry in the "Cloud Capacity Queries" table 232 that is associated with this new column. Similarly, upon removing a cloud capacity column 244 from the "Cloud Capacity Snapshot" table 230, the database server 104 may execute a business rule that removes the corresponding entry in the "Cloud Capacity Queries" table 232.

Figure 5:
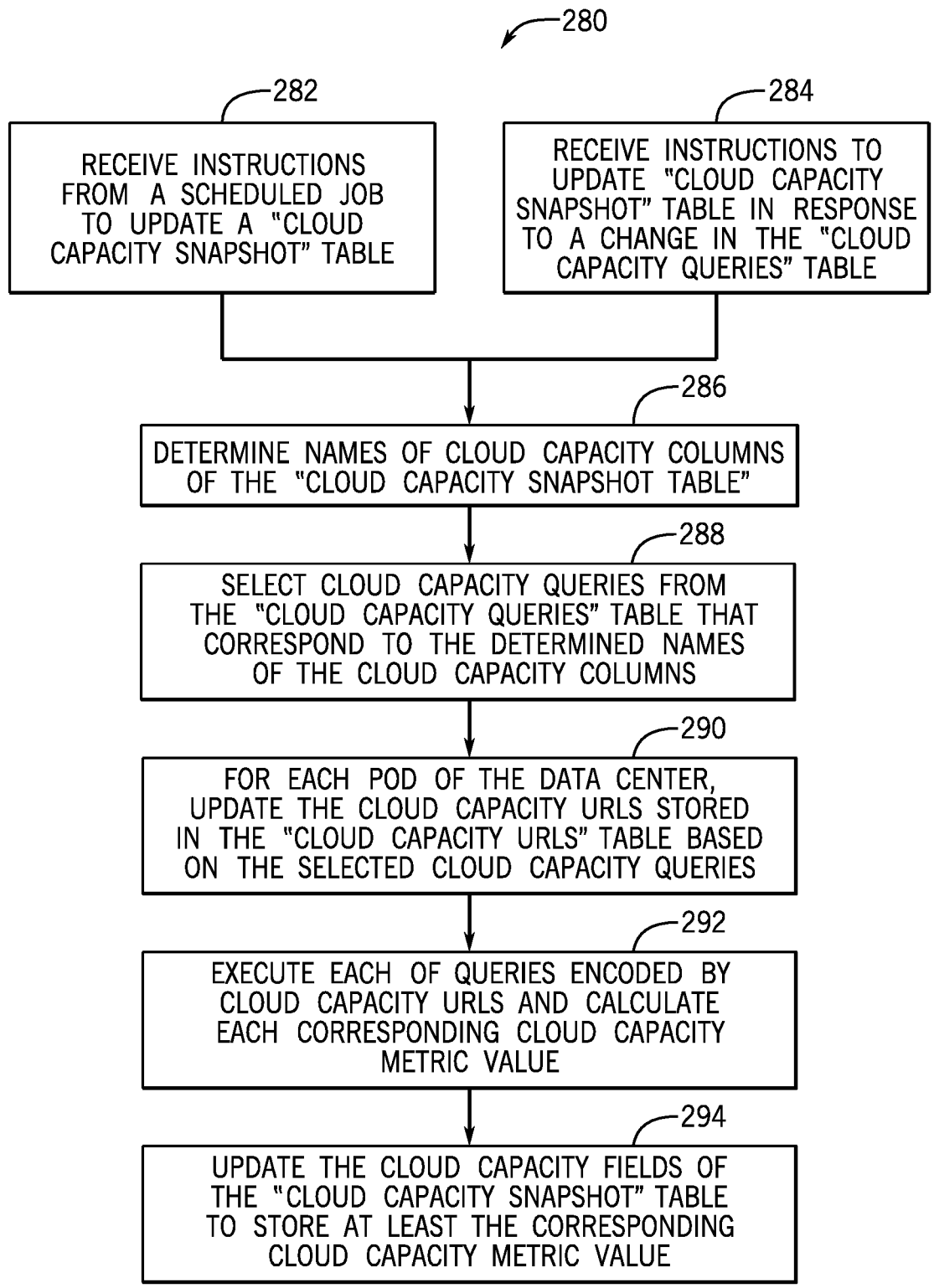
FIG. 5 is a flow diagram illustrating an embodiment of a process by which the cloud capacity system updates the "Cloud Capacity Snapshot" table, in accordance with aspects of the present disclosure.

During operation of the cloud capacity system 222, the "Cloud Capacity Snapshot" table 230 may be updated on a recurring interval (e.g., once per day, once per hour) or in response to changes made to the "Cloud Capacity Queries" table 232. For example, FIG. 5 is a flow diagram illustrating an embodiment of a process 280 by which the cloud capacity tool 224 may update the "Cloud Capacity Snapshot" table 230. The process 280 may be stored in a suitable memory (e.g., memory 206) and executed by a suitable processor (e.g., processor(s) 202) associated with the cloud capacity server 26 of the data center instance 220. It may be appreciated that, in other embodiments, the process 280 may include additional steps, fewer steps, repeated steps, and so forth, in accordance with the present disclosure. The discussion of the process 280 includes references to FIG. 4, discussed above.

For the embodiment illustrated in FIG. 5, the process 280 may begin with the cloud capacity system 222 receiving (block 282) instructions from a routine or scheduled job to update the "Cloud Capacity Snapshot" table 230 at a particular time of day, such as during a low-usage time period. In other situations, the cloud capacity system 222 may be triggered by instructions (e.g., by a database or business rule) to update the "Cloud Capacity Snapshot" table 230 in response to detecting a change in the "Cloud Capacity Queries" table 232 (block 284). In either case, the cloud capacity system 222 may respond by first determining (block 286) the names of the cloud capacity columns 244 that have been defined in the "Cloud Capacity Snapshot" table 230. For example, the cloud capacity system 222 may query the "Cloud Capacity Snapshot" table 230 or another suitable table (e.g., the "Data center" table 238) to identify the names of the cloud capacity columns 244 defined in the "Cloud Capacity Snapshot" table 230.

For the embodiment illustrated in FIG. 5, the process 280 continues with the cloud capacity system 222 selecting (block 288) or retrieving cloud capacity queries from the "Cloud Capacity Queries" table 232 that correspond to the names of the cloud capacity columns 244 of the "Cloud Capacity Snapshot" table 230 determined in block 286. For example, the cloud capacity system 222 may query the "Cloud Capacity Queries" table 232 to retrieve the query information (e.g., the values stored in the "Query" field 248, the "Combination Operation" field 256, the "Combination Operation Column" field 260, and so forth) for each entry that is related to the cloud capacity columns 244 of the "Cloud Capacity Snapshot" table 230.

For the embodiment illustrated in FIG. 5, the process 280 continues with the cloud capacity system 222 updating (block 290), for each pod of the data center 18, the cloud capacity URLs stored in the "Cloud Capacity URLs" table 234, based on the selected cloud capacity queries. That is, the cloud capacity system 222 may modify the "CC URL" field 268 of each entry in the "Cloud Capacity URLs" table 234 to encode the details of the corresponding cloud capacity query selected in block 288. For example, the cloud capacity system 222 may modify the "CC URL" field 268 of an entry in the "Cloud Capacity URLs" table 234 to encode the value stored in the "Pod ID" field 264 of the entry in the "Cloud Capacity URLs" table 234, as well as the values stored in the "Query" field 248, the "Combination Operation" field 256, and the "Combination Operation Column" field 260 of the corresponding cloud capacity query. It may be appreciated that, for situations in which new cloud capacity fields 244 were added to the "Cloud Capacity Snapshot" table 230 and new corresponding entries were added to the "Cloud Capacity Queries" table 232, new entries are added to the "Cloud Capacity URLs" table 234 during the updating of block 290.

For the embodiment illustrated in FIG. 5, the process 280 continues with the cloud capacity system 222 executing (block 292) each of the queries encoded by the cloud capacity URLs stored in the "Cloud Capacity URLs" table 234 to calculate each corresponding cloud capacity metric value for each pod of the data center 18. As discussed above, since the calculation of each cloud capacity metric of each pod of the data center 18 is embodied as a distinct value of a "CC URL" field 268 in the "Cloud Capacity URLs" table 234, accessing (e.g., selecting, requesting, resolving, following) the location identified each "CC URL" field 268 results in the database server 104 executing the encoded query to calculate the value of the corresponding cloud capacity metric for the particular pod of the data center 18.

As mentioned, when executed by the database server 104 in response to the cloud capacity URL being accessed, each query encoded by a cloud capacity URL calculates a numerical value (e.g., an integer) as a result for the corresponding cloud capacity metric. For example, in certain embodiments, a first portion of a cloud capacity URL, which encodes the value of the filter criteria 240 of the associated cloud capacity query for a particular pod, may select a number of records from a database table based on the specified filter criteria. A second portion of the cloud capacity URL, which encodes the "Combination Operation" field 256 and the "Combination Operation Column" field 260 of the associated cloud capacity query, may combine the values of the identified column in the specified manner, for example, by counting the number of values, calculating a sum of the values, calculating an average of the values, selecting a minimum of the values, selecting a maximum of the values, or another suitable combination of the values in the identified column. As such, the output of the second portion of the cloud capacity URL is the calculated value of the corresponding cloud capacity metric.

For the embodiment illustrated in FIG. 5, the process 280 concludes with the cloud capacity system 222 updating (block 294) the cloud capacity fields 244 of the "Cloud Capacity Snapshot" table 230 using the cloud capacity metric values calculated in block 292. For example, in certain embodiments, each of the cloud capacity fields 244 of the "Cloud Capacity Snapshot" table 230 are updated to store the numerical value of the cloud capacity metric that is returned in response to following the corresponding cloud capacity URL for a particular pod and cloud capacity column combination. As mentioned, in other embodiments, the cloud capacity fields 244 of the "Cloud Capacity Snapshot" table 230 may instead be updated to store a respective URL, distinct from the cloud capacity URL, which may be referred to herein as a snapshot URL for clarity. For example, each of the cloud capacity fields 244 of the "Cloud Capacity Snapshot" table 230 may be updated to include a respective snapshot URL that presents (e.g., as the URL name) the calculated value of the associated cloud capacity metric, wherein the snapshot URL points or refers to the query results of the first portion of the query encoded by the cloud capacity URL, which represents the underlying data from which the cloud capacity metric value was calculated. For such embodiments, as discussed below, when the "Cloud Capacity Snapshot" table 230 is presented by the GUI 226, the contents of each of the cloud capacity fields 244 may be presented as a snapshot URL that presents the calculated value of the cloud capacity metric, and that, upon selection, presents a table that includes the underlying data that was combined to calculate the cloud capacity metric value. As mentioned, in certain embodiments, prior to updating the "Cloud Capacity Snapshot" table 230, the contents may be added to the "Cloud Capacity Archive" table 236 to preserve the previous information for cloud capacity trend analysis.

Figure 6:
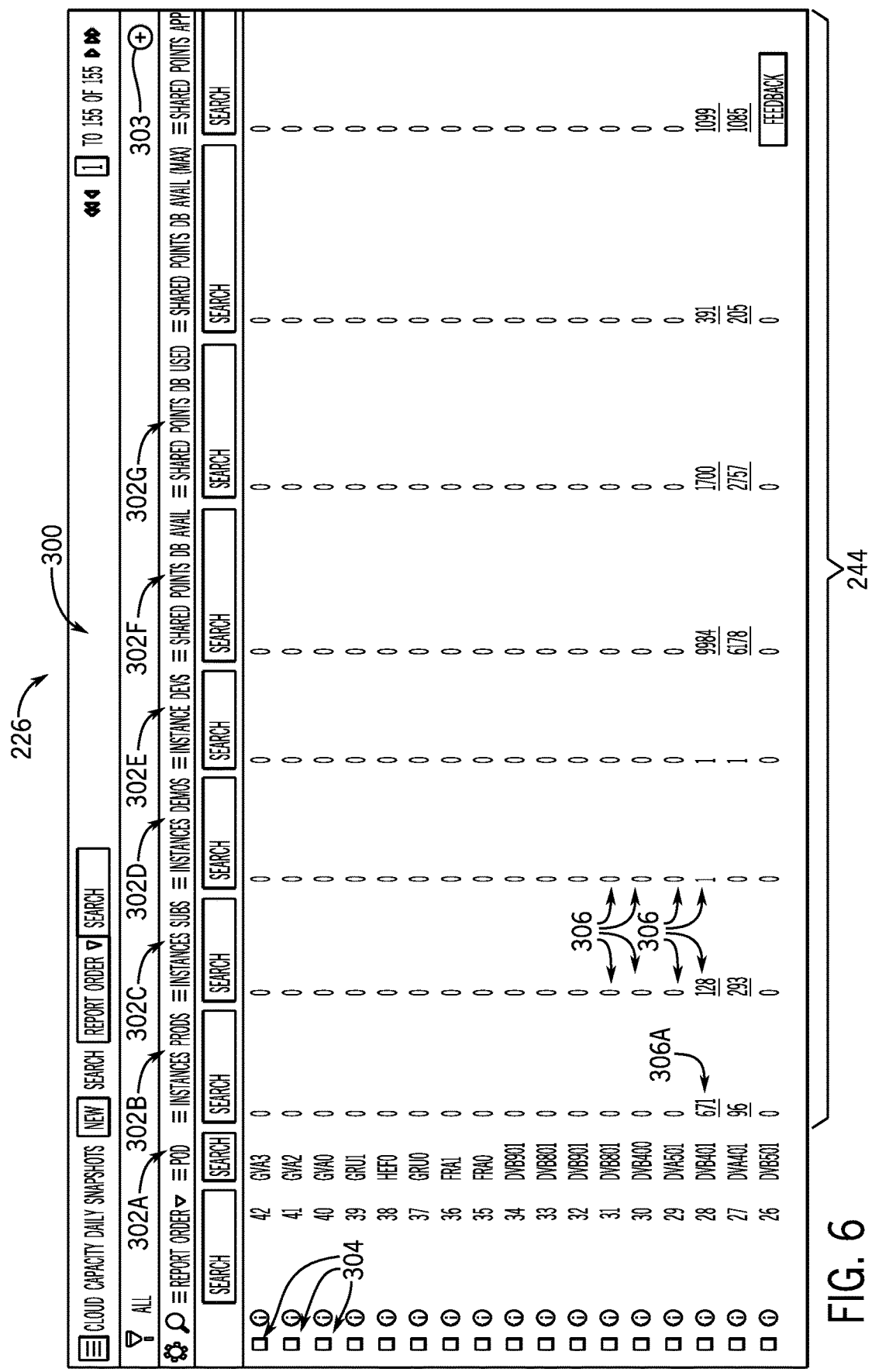

FIGS. 6-9 are simulated screenshots of portions of the GUI 226 for an embodiment of the cloud capacity system 222. More specifically, the portion of the GUI 226 illustrated in FIG. 6 is designed to present the contents of the "Cloud Capacity Snapshot" table 230 to a suitable user (e.g., a data center administrator). As such, the GUI 226 includes a table 300 having columns 302 that correspond to columns, and rows 304 that correspond to entries or records, of the "Cloud Capacity Snapshot" table 230. As such, the table 300 of the GUI 226 presents a "Pod ID" column 302A, and each of the rows 304 includes a value in this field indicating which pod is described by the row. The illustrated table 300 of the GUI 226 includes a number of cloud capacity columns 244 of the "Cloud Capacity Snapshot" table 230, including a "Instances Prods" column 302B that presents a number of production instances hosted by each pod, an "Instances Subs" column 302C that presents a number of substitution or backup instances hosted by each pod, an "Instance Demos" column 302D that presents a number of demo instances hosted by each pod, an "Instance Devs" column 302D that presents a number of developer instances hosted by each pod, a "Shared Points DB Avail" column 302E that presents a number of shared database points or servers that are available to each pod, a "Shared Points DB Used" column 302F that presents a number of shared database points that are used by each pod, and so forth. It may be appreciated that the table 300 of the GUI 226, as well as the underlying "Cloud Capacity Snapshot" table 230, may include any suitable number of cloud capacity columns 244 that present and store values for various cloud capacity metrics. In certain embodiments, the GUI 226 includes an "Add Cloud Capacity Column" button 303 that, in response to receiving user input, causes the cloud capacity system 222 to create a new cloud capacity column 244 in the "Cloud Capacity Snapshot" table 230.

As mentioned, for the embodiment illustrated in FIG. 6, each of the cloud capacity fields 244 of the table 300 includes a respective snapshot URL 306. Each snapshot URLs 306 presents the value of the corresponding cloud capacity metric, which may be calculated as set forth above. Additionally, each of the snapshot URLs 306 points to or encodes a query for the underlying data from which the corresponding cloud capacity metric was calculated. For example, in response to receiving a user selection of URL 306A, which indicates that pod "DVB401" has 671 production instances, the GUI 226 may present the user with new table that displays information for the 671 production instances hosted by pod "DVB401." In certain embodiments, the query encoded by the snapshot URL 306A may include the filter criteria 248 of the particular cloud capacity query that is associated with the cloud capacity column 302B, along with an additional filter criteria to limit the data to resources associated with pod "DVB401."

Figure 7:
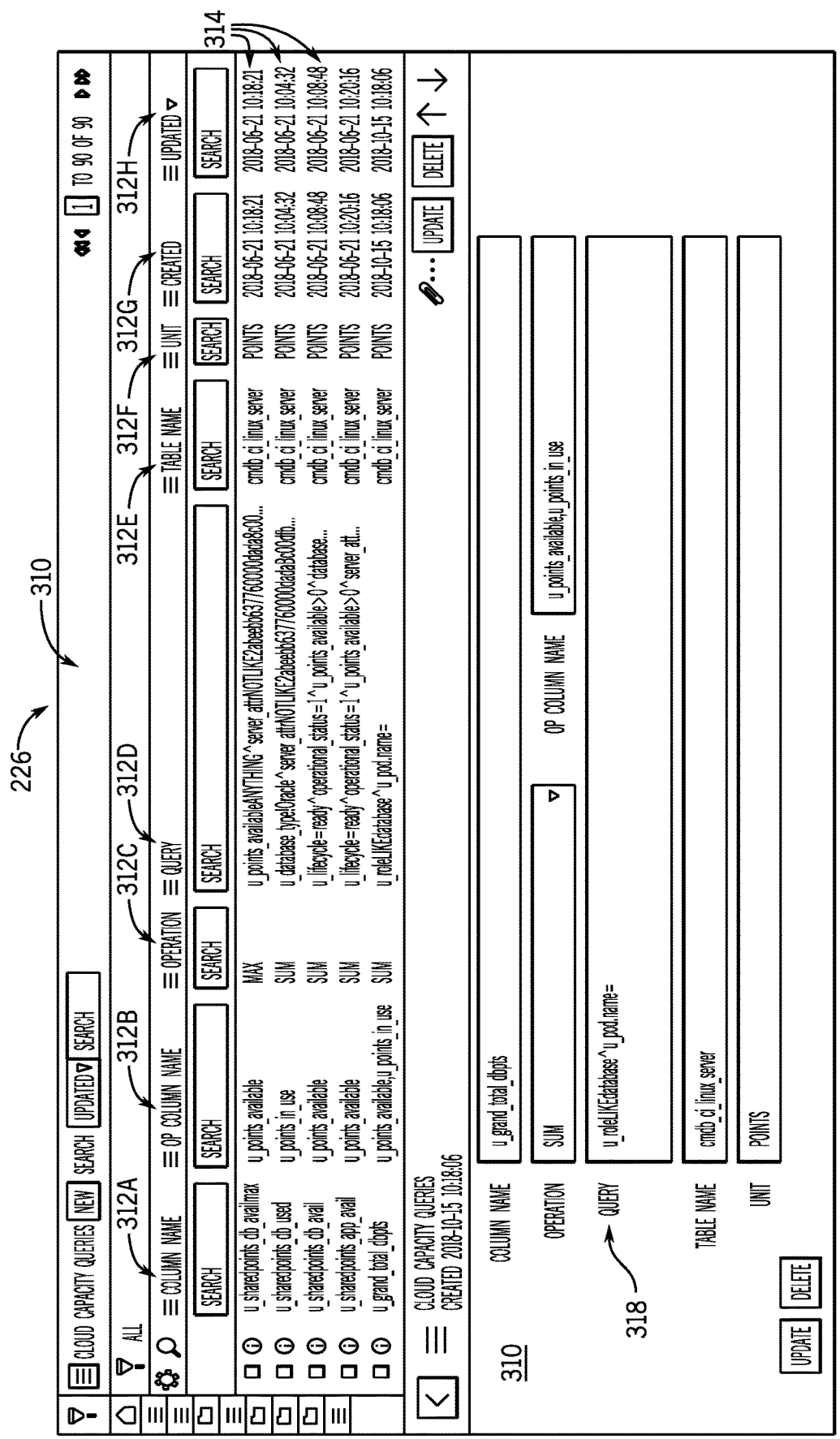

The portion of the GUI 226 illustrated in FIG. 7 presents the contents of the "Cloud Capacity Queries" table 232. As such, the GUI 226 includes a table 310, wherein the columns 312 of the table 310 correspond to columns, and the rows 314 correspond to entries or records, of an embodiment of the "Cloud Capacity Queries" table 232. The illustrated portion of the GUI 226 also includes an editing section 316 having suitable user input mechanisms (e.g., text boxes, select boxes, check boxes) to enable the user to update one or more fields of a record selected in the table 310.

The columns 312 of the table 310 include column 312A that corresponds to the "CC field name" field 246, column 213B that corresponds to the "Combination Operation" field 256, column 312C that corresponds to the "Combination Operation Column" field 256, and column 312D that corresponds to the "Query" field 248 of the "Cloud Capacity Queries" table 232 discussed above. For the illustrated embodiment, the table 310 of the GUI 226 and the underlying "Cloud Capacity Queries" table 232 include a "Table Name" column 312E that presents and stores the name of the database table on which the query is applied, while in other embodiments, this table name may be includes as part of the "Query" field 248. For the illustrated embodiment, the columns 312 include a "Unit" column 312F that presents and stores a unit for the corresponding cloud capacity metric. Additionally, the illustrated table 310 includes a "Created" column 312G and an "Updated" column 312H, which correspond to the audit fields 270 of the "Cloud Capacity URLs" table 234.

Figure 8:
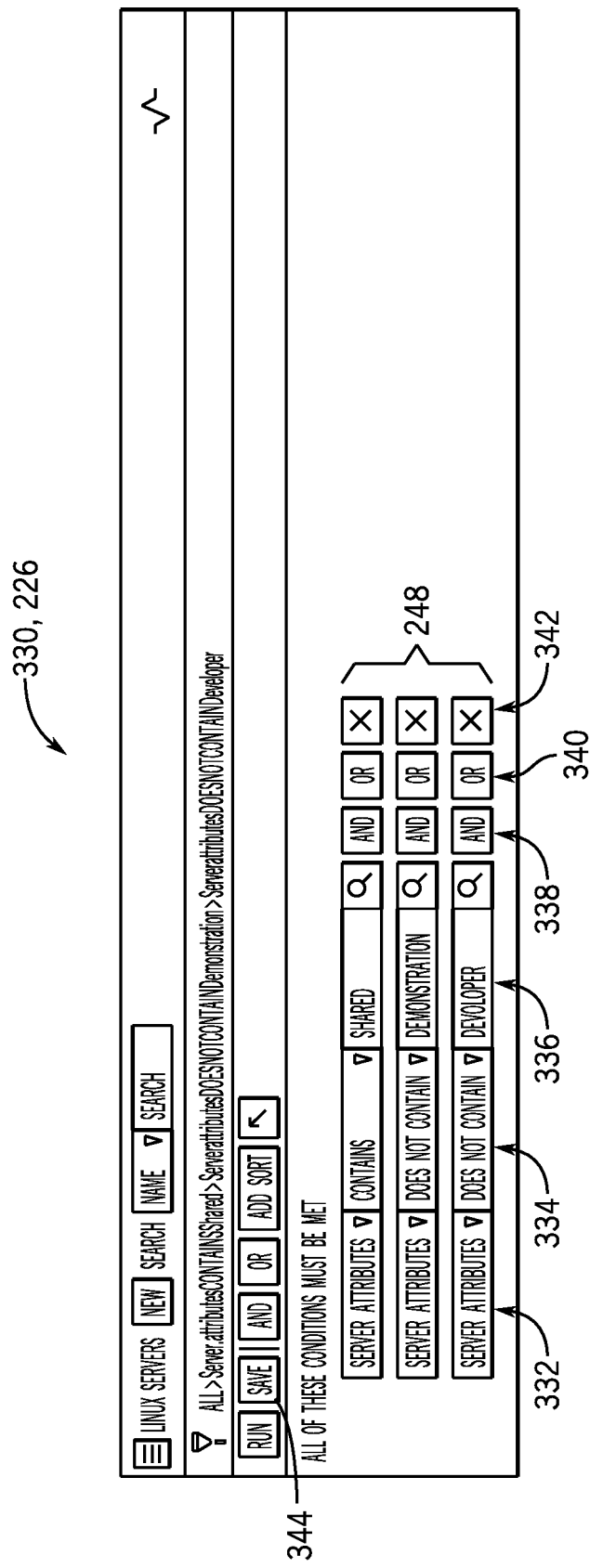

In certain embodiments, when the user selects a "Query" text box 318 of the editing section 316 of the GUI 226 illustrated in FIG. 7, the cloud capacity system 222 may present the user a query editor 330 of the GUI 226, as illustrated in FIG. 8. That is, in addition to enabling the user to provide text to define the value of the "Query" field 248 of the "Cloud Capacity Queries" table 232, the query editor 330 of the cloud capacity system 222 may enable the user to visually construct the query by providing selections that define the filter criteria 248 for the query. It may be appreciated that these features of the cloud capacity system 222 enable different data center pods to have different customized queries to calculate different cloud capacity metrics. For example, using these features, an administrator may design a first query for a particular instance count metric which includes developer instances when it is calculated for a pod of a first data center, and design a second query for the instance count metric which excludes developer instances when it is calculated for a pod of a second data center.

For the embodiment illustrated in FIG. 8, the query editor 330 includes a first set of select boxes 332 that may be populated with properties or fields of the table indicated in the "Table Name" field 312E for the embodiment illustrated in FIG. 7. The query editor 330 includes a second set of select boxes 334 that are populated with comparison operations, such as "contains", "does not contain", "is", "is not", "belongs to", "does not belong to", and so forth. The query editor 330 also includes a third set of user input mechanisms 336, which include text boxes, as well as select boxes populated with known values (e.g., true or false), depending on the data type of the property indicated by the select boxes 332.

To construct the illustrated filter criteria 248, the user selects the "Server attributes" parameter or field using the first set of select boxes 332. The user selects the appropriate comparison operations for each filter criterion using the second set of select boxes 334. The user then provides suitable values for each filter criterion using the third set of user input mechanisms 336. For the illustrated example, each of the illustrated filter criterion are combined with an "AND" Boolean operator, and additional filter criteria may be added by selecting the "AND" button 338 or the "OR" button 340. Additionally, a particular filter criterion may be removed in response to the user selecting the corresponding "Remove filter" button 342. Once the query editor 330 receives input from the user selecting the "Save" button 344, then the query editor 330 may convert the filter criteria illustrated in FIG. 8 to a text string that is used to populate the "Query" field 248 of the corresponding entry in the "Cloud Capacity Queries" table 232.

The portion of the GUI 226 illustrated in FIG. 9 is designed to present information stored within the "Cloud Capacity URLs" table 234. As such, the GUI 226 includes a table 350 having columns 352 that correspond to the columns, and rows 354 that correspond to the entries or records, of an embodiment of the "Cloud Capacity URLs" table. The columns 352 include column 352A that corresponds to the "CC Field Name" field 266, column 352B that corresponds to the "Pod ID" field 264, column 352C that corresponds to the "CC URL" field 268, in addition to other fields. As mentioned above, the "Cloud Capacity URLs" table 234 is automatically generated in response to changes to the "Cloud Capacity Queries" table 232 or in response to a call from a scheduled (e.g., hourly, daily, nightly) job.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud capacity system hosted by a data center having a plurality of pods, the system comprising:
   a memory storing a cloud capacity snapshot table, a cloud capacity queries table, and a cloud capacity uniform resource locators (URLs) table, wherein the cloud capacity snapshot table includes a cloud capacity column configured to store a respective cloud capacity metric value for each of the plurality of pods of the data center; and
   a processor configured to execute instructions stored in the memory to perform actions comprising:
      selecting a cloud capacity query from the cloud capacity queries table that corresponds to the cloud capacity column; and for each pod of the plurality of pods of the data center:
    storing a cloud capacity URL in the cloud capacity URLs table that encodes the cloud capacity query to calculate the respective cloud capacity metric value for the pod of the data center;
    accessing the cloud capacity URL to execute the encoded cloud capacity query and, in response, receiving the respective cloud capacity metric value for the pod of the data center; and
    updating the cloud capacity column of the cloud capacity snapshot table to include the respective cloud capacity metric value for the pod of the data center.

2. The system of claim 1, wherein the cloud capacity snapshot table includes a first pod identifier column configured to store a respective pod identifier value for each of the plurality of pods of the data center.

3. The system of claim 2, wherein the cloud capacity URLs table includes a second pod identifier column configured to store the respective pod identifier value for each of the plurality of pods of the data center, wherein the cloud capacity snapshot table and the cloud capacity URLs table are related by the first pod identifier column and the second pod identifier column.

4. The system of claim 1, wherein the cloud capacity queries table includes a cloud capacity name column configured to store a name of the cloud capacity column.

5. The system of claim 4, wherein the cloud capacity URLs table includes a second cloud capacity name column configured to store the name of the cloud capacity column, wherein the cloud capacity queries table and the cloud capacity URLs table are related by the cloud capacity name column and the second cloud capacity name column.

6. The system of claim 1, wherein the cloud capacity query comprises:
    filter criteria including at least one parameter of a database table, at least one comparison operator, and at least one value;
    a combination operation column that indicates which column of the database table is combined to calculate the respective cloud capacity metric; and
    a combination operation that indicates how values in the column of the database table are combined to calculate the respective cloud capacity metric.

7. The system of claim 6, wherein the combination operation comprises summing the values in the column, counting the values in the column, determining a minimum value in the column, determining a maximum value in the column, or determining an average of the values in the column of the database table.

8. The system of claim 6, wherein the processor is configured to execute the instructions stored in the memory to perform actions comprising:
    generating the cloud capacity URL before storing the cloud capacity URL in the cloud capacity URLs table, wherein the cloud capacity URL encodes the filter criteria, the combination operation column, and the combination operation of the cloud capacity query, as well as an identity of the pod.

9. The system of claim 6, wherein the cloud capacity system comprises a graphical user interface (GUI) comprising user input mechanisms configured to enable a user to visually construct the filter criteria of the cloud capacity query.

10. The system of claim 1, wherein the memory includes a cloud capacity archive table, and the processor is configured to execute the instructions stored in the memory to perform actions comprising:
    before updating the cloud capacity column of the cloud capacity snapshot table, adding the respective cloud capacity metric value of each of the plurality of pods of the data center to the cloud capacity archive table.

11. The system of claim 1, wherein the cloud capacity queries table, the cloud capacity URLs table, or a combination thereof, includes at least one audit field configured to store audit information related to data modifications within the cloud capacity queries table, the cloud capacity URLs table, or the combination thereof.

12. A method of operating a cloud capacity system on a data center having a plurality of pods, comprising:
    selecting a plurality of cloud capacity queries from a cloud capacity queries table, wherein each of the plurality of cloud capacity queries is related to a respective cloud capacity column of a cloud capacity snapshot table, and each respective cloud capacity column is configured to store a respective cloud capacity metric value for each of the plurality of pods of the data center;
    for each cloud capacity query of the plurality of cloud capacity queries:
        for each pod of the plurality of pods of the data center:
            storing a cloud capacity uniform resource locator (URL) in a cloud capacity URLs table, wherein the cloud capacity URL encodes the cloud capacity query to calculate the respective cloud capacity metric value for the pod of the data center;
            accessing the cloud capacity URL to execute the encoded cloud capacity query and, in response, receiving the respective cloud capacity metric value for the pod of the data center; and
            updating the respective cloud capacity column of the cloud capacity snapshot table that corresponds to the cloud capacity query to include the respective cloud capacity metric value for the pod of the data center.

13. The method of claim 12, comprising determining a respective name of each cloud capacity column of the cloud capacity snapshot table, and wherein selecting comprises:
    selecting the plurality of cloud capacity queries from the cloud capacity queries table based on the respective name of each cloud capacity column of the cloud capacity snapshot table.

14. The method of claim 12, wherein the selecting the plurality of cloud capacity queries is triggered by a scheduled job hosted by the data center.

15. The method of claim 12, comprising:
    before selecting the plurality of cloud capacity queries, receiving user input from a graphical user interface (GUI) of the cloud capacity system, and in response, modifying at least one of the cloud capacity queries stored in the cloud capacity queries table based on the received user input.

16. The method of claim 15, wherein the selecting of the plurality of cloud capacity queries is triggered by the modification of at least one of the cloud capacity queries.

17. The method of claim 12, wherein updating the respective cloud capacity column comprises:
    storing the respective cloud capacity metric value for the pod of the data center as a numerical value in the respective cloud capacity column.

18. The method of claim 12, wherein updating the respective cloud capacity column comprises:

storing a snapshot URL in the respective cloud capacity column for the pod of the data center, wherein the snapshot URL has a name that is the respective cloud capacity metric value for the pod of the data center, and the snapshot URL refers to a query that includes filter criteria of the cloud capacity query.

19. One or more tangible, non-transitory, computer-readable media at least collectively storing instructions executable by a processor of a data center having a plurality of pods, wherein the instructions include instructions to:

select a cloud capacity query from a cloud capacity queries table, wherein the cloud capacity query corresponds to a cloud capacity column of a cloud capacity snapshot table, and the cloud capacity column is configured to store a respective cloud capacity metric value for each of the plurality of pods of the data center; and for each pod of the plurality of pods of the data center:

store a cloud capacity uniform resource locator (URL) in a cloud capacity URLs table, wherein the cloud capacity URL encodes the cloud capacity query to calculate the respective cloud capacity metric value for the pod of the data center;

access the cloud capacity URL to execute the encoded cloud capacity query and, in response, receive the respective cloud capacity metric value for the pod of the data center; and update the cloud capacity column of the cloud capacity snapshot table to include the respective cloud capacity metric value for the pod of the data center.

20. The media of claim 19, wherein the instructions comprise instructions to:

select a second cloud capacity query from the cloud capacity queries table, wherein the second cloud capacity query corresponds to a second cloud capacity column of the cloud capacity snapshot table, and the second cloud capacity column is configured to store a second respective cloud capacity metric value for each of the plurality of pods of the data center; and for each pod of the plurality of pods of the data center:

store a second cloud capacity URL in the cloud capacity URLs table, wherein the second cloud capacity URL encodes the second cloud capacity query to calculate the second respective cloud capacity metric value for the pod of the data center;

access the second cloud capacity URL to execute the second encoded cloud capacity query and, in response, receive the second respective cloud capacity metric value for the pod of the data center; and update the second cloud capacity column of the cloud capacity snapshot table to include the second respective cloud capacity metric value for the pod of the data center.

\* \* \* \* \*